US012773652B2

(12) United States Patent
Lagerstedt

(10) Patent No.: US 12,773,652 B2
(45) Date of Patent: Oct. 27, 2026

(54) WATER FILTRATION APPARATUS

(71) Applicant: Oyster Products LLC, Brooklyn, NY (US)

(72) Inventor: Jonas Lagerstedt, Brooklyn, NY (US)

(73) Assignee: Oyster Products LLC, Brooklyn, NY (US)

( * ) Notice: Subject to any disclaimer, the term of this patent is extended or adjusted under 35 U.S.C. 154(b) by 422 days.

(21) Appl. No.: 18/498,795

(22) Filed: Oct. 31, 2023

(65) Prior Publication Data

US 2025/0135381 A1 May 1, 2025

(51) Int. Cl.

| | |
|---|---|
| ***B01D 35/157*** | (2006.01) |
| ***B01D 29/11*** | (2006.01) |
| ***B01D 39/20*** | (2006.01) |
| ***C02F 1/00*** | (2023.01) |

(52) U.S. Cl.

CPC .......... *B01D 35/1573* (2013.01); *B01D 29/11* (2013.01); *B01D 39/2055* (2013.01); *C02F 1/003* (2013.01); *B01D 2201/167* (2013.01); *B01D 2201/347* (2013.01); *B01D 2201/4092* (2013.01); *C02F 2201/005* (2013.01)

(58) Field of Classification Search

None

See application file for complete search history.

(56) References Cited

U.S. PATENT DOCUMENTS

| | | | | |
|---|---|---|---|---|
| 5,240,620 A | | 8/1993 | Shalev | |
| 7,874,326 B1 | | 1/2011 | Harvey | |
| 8,413,694 B2 | | 4/2013 | Williams et al. | |
| 2008/0197062 A1 | * | 8/2008 | Collins ................ | B01D 63/046 210/136 |
| 2012/0037549 A1 | * | 2/2012 | van Savooijen ..... | B01D 35/147 210/457 |
| 2014/0151304 A1 | | 6/2014 | Bradford et al. | |

FOREIGN PATENT DOCUMENTS

| | | |
|---|---|---|
| EP | 1489041 A1 | 12/2004 |
| ES | 1058783 U | 2/2005 |

OTHER PUBLICATIONS

Brand: Scat, Title: “Safety funnels: collect and dispose of chemicals safely”, dated Oct. 14, 2023 Website Link—https://scat-europe.com/en/products/safety-funnels/overview/.

* cited by examiner

*Primary Examiner* — Richard C Gurtowski

(74) *Attorney, Agent, or Firm* — Jeremy A. Briggs

(57) ABSTRACT

A gravity-based filtration apparatus is disclosed. The apparatus may include a container, a filter, one or more elongated slits and a drip stop valve assembly. The container may be configured to receive a fluid, and dispense the fluid from an opening disposed at a container bottom portion. The filter may be disposed in a container interior portion and may be configured to remove impurities from the fluid before the fluid may be dispensed from the opening. The elongated slits may be disposed on a container wall at the container bottom portion. The drip stop valve assembly may include one or more arms or fins that may be disposed in proximity to the elongated slits. The arms may move between a retracted position and an extended position. The drip stop valve assembly may enable fluid dispensation from the opening when the arms may be in the retracted position.

19 Claims, 6 Drawing Sheets

WATER FILTRATION APPARATUS

TECHNICAL FIELD

The present disclosure relates to a water filtration apparatus, and more specifically to a funnel-shaped water filtration apparatus with a drip stop valve.

BACKGROUND

Impurities in water are known to cause health related issues in users who consume such water. Many users prefer to treat the water to remove the impurities, before consuming the water. For example, many users boil water before consumption, use gravity based or reverse osmosis (RO) based water filters, etc., to treat the water. While treating the water using these conventional methods and systems does remove impurities from the water, implementing such methods or using conventional water filtering systems is not convenient. For example, conventional gravity-based water filters include bulky containers that are inconvenient for serving water. The users are required to pour the water from the bulky containers to a separate (and smaller) container to serve water, which causes inconvenience to the users. Further, because of their bulkiness and the fact that gravity filter water jugs are often made from inferior quality materials that break easily, they have limited utility when the users desire to treat water at different locations (vacation home, etc.) and not just in proximity to where it was originally placed (e.g., home kitchen).

Further, RO based water filters are expensive and complicated to install, and hence many users do not prefer to use such filters.

Further, such water filtering systems are not portable, and hence have limited utility when the users desire to treat water at different locations and not just in proximity to a water source (e.g., a tap).

Thus, there is a need for a water filtering system that is convenient to use, and that is portable enough to bring to different locations, away from home, where there may be a water tap.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
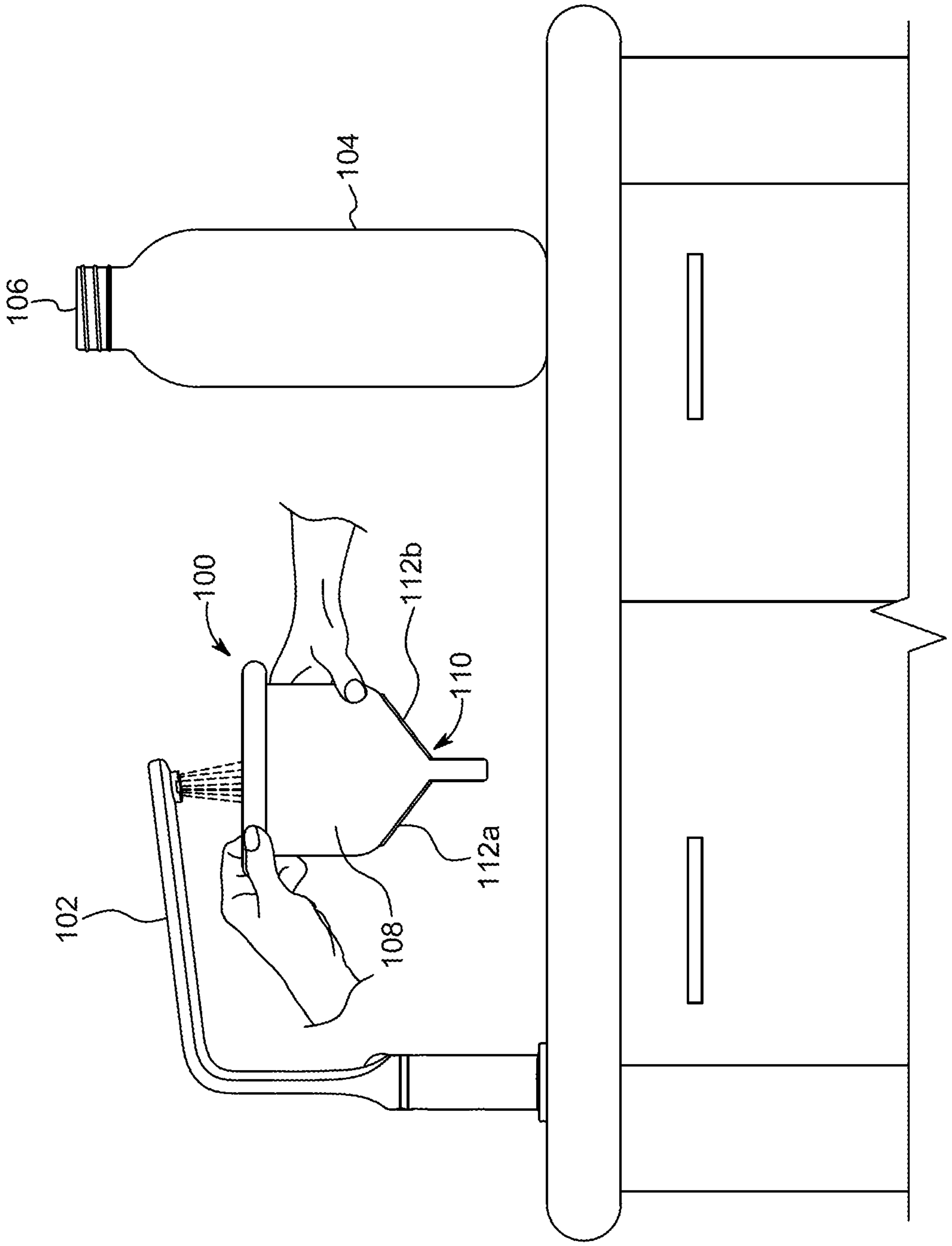
FIG. 1A depicts an example filtration apparatus being filled with a fluid by using a fluid source in accordance with the present disclosure.

The present disclosure is directed to a gravity-based water filtration apparatus ("apparatus"). The apparatus may be shaped as a funnel and may include a container, a drip stop valve assembly ("assembly") and a filter. The container may be configured to receive and store water (or fluid) in a container interior portion, and may be configured to dispense the stored water from an opening present in a container bottom portion. The filter may be disposed in the container interior portion and may be configured to remove impurities from the water before the water may be dispensed from the opening. In some aspects, the filter may be a carbon-activated filter.

The assembly may be configured to disable water dispensation from the opening when the apparatus may be held vertically by a user and when the apparatus may not be placed on a water vessel. Further, the assembly may enable water dispensation from the opening when the apparatus may be placed on the water vessel or when the user manually enables water dispensation via the assembly. In some aspects, the assembly may include one or more fins/arms and the container bottom portion may include one or more elongated slits. An arm longitudinal axis may be aligned with an elongated slit longitudinal axis, and the arms may be configured to move in and out of the container interior portion via the elongated slits. In some aspects, the arms may be in extended positions when the arms may protrude out from the container interior portion via the elongated slits, and may be in retracted positions when the arms may be inserted into the container interior portion via the elongated slits.

The arms may move to the extended positions due to assembly or apparatus weight when the user holds the apparatus vertically and does not place the apparatus on the water vessel. Further, the arms may move to the retracted positions when the apparatus may be placed on the water vessel. Specifically, in this case, edges of a water vessel top end may "push" the arms into the container interior portion when the apparatus may be placed on the water vessel, thereby enabling arm movement to the retracted position. In some aspects, the assembly may disable water dispensation from the opening when the arms may be in the extended positions, and may enable water dispensation from the opening when the arms may be in the retracted positions.

The present disclosure discloses a water filtration apparatus that is shaped as a funnel. The funnel-shaped water filtration apparatus has an angular bottom portion that is symmetrical in shape, and hence can "rest" on any fluid vessel (e.g., bottle, carafe, etc.) that the user may have at user's home for serving water. Further, the water filtration apparatus does not include any protruding handles, and hence the apparatus rests symmetrically on the fluid vessel without tilting on any side. Specifically, the symmetrical funnel-shaped design, combined with the angled bottom portion, makes the apparatus guide itself and "rest in position" on top of the rim of the fluid vessel and stay upright (and not tilt) when the apparatus is placed on top of the fluid vessel. Furthermore, the drip stop valve assembly included in the apparatus prevents water from spilling/dispensing from the apparatus when the user may be filling the water into the container or when the user may be moving the apparatus from one location to another. In addition, the drip stop valve assembly may automatically enable water dispensation from the apparatus into the water vessel when the apparatus may be placed on the water vessel, thereby enhancing ease of apparatus usage for the user.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1A depicts an example filtration apparatus 100 (or apparatus 100) being filled with a fluid by using a fluid source 102 in accordance with the present disclosure. The apparatus 100 may be, for example, a gravity-based water filtration apparatus. FIG. 1A will be described in conjunction with FIG. 1B, which depicts the apparatus 100 being placed or disposed on a fluid vessel 104 (or a fluid container/bottle) in accordance with the present disclosure.

The fluid may be, for example, water, and the fluid source 102 may be, for example, a water tap that supplies water received from a utility water source (not shown). The fluid vessel 104 may be any conventional bottle, container or vessel that may be configured to receive the fluid from an opening present at a vessel top end 106. Further, a fluid vessel interior portion may be configured to store the fluid received via the opening present at the vessel top end 106.

The apparatus 100 may have a hollow interior portion that may be configured to receive the fluid from the fluid source 102. Specifically, the apparatus 100 may include a container 108 that may have a hollow container interior portion and an open container top end/portion. The container 108 may receive the fluid from the fluid source 102 via the open container top portion, and the container interior portion may be configured to store the fluid received via the open container top portion. The container 108 may further include an opening (not shown in FIGS. 1A and 1B) present in a container bottom portion through which the fluid stored in the container interior portion may be dispensed from the apparatus 100.

Figure 1B:
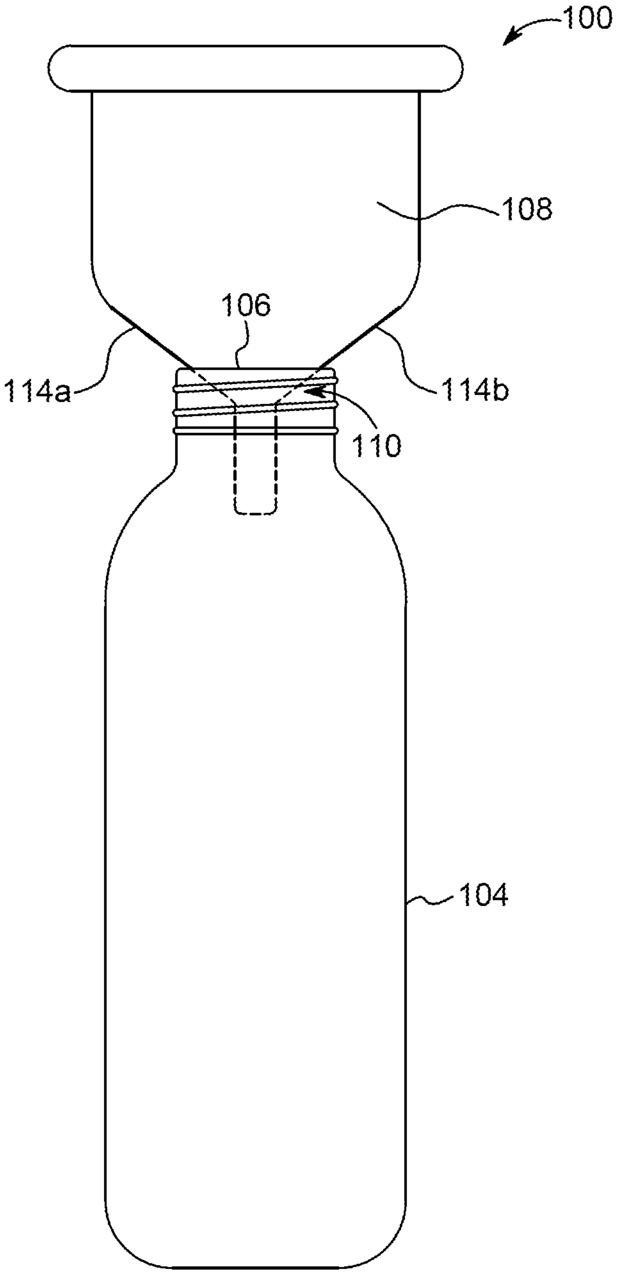
FIG. 1B depicts an example filtration apparatus placed on a fluid vessel in accordance with the present disclosure.

The apparatus 100 may further include a drip stop valve assembly 110 (or drip valve assembly) that may be disposed at the container bottom portion. The drip stop valve assembly 110 may be configured to enable and disable fluid dispensation from the opening present in a container bottom portion. Stated another way, the drip stop valve assembly 110 may be configured to enable and disable flow of fluid from the container interior portion to outside via the opening present in the container bottom portion. In some aspects, the drip stop valve assembly 110 may include one or more drip stop valve fins or arms 112*a*, 112*b* (or arms 112) that may be configured to move between an extended position and a retracted position. The drip stop valve assembly 110 may disable flow of fluid from the container interior portion to outside when the arms 112 may be in the extended position, as shown in FIG. 1A, and may enable flow of fluid from the container interior portion to outside when the arms 112 may be in the retracted position, as shown in FIG. 1B.

In some aspects, the container wall may include one or more elongated slits 114*a*, 114*b* (or slits 114, which may be, for example, elongated through-holes) that may be disposed in proximity to the container bottom portion. Each slit 114 may be aligned with corresponding arm 112. The arms 112 may be in the retracted position when the arms 112 may be inserted into the container interior portion via the slits 114, and the arms 112 may be in the extended position when the arms 112 may be protruding out from the container interior portion and towards a container exterior portion via the slits 114.

In some aspects, the arms 112 may automatically move to the extended position due to gravitation force or drip stop valve assembly weight when the apparatus 100 may be held vertically (e.g., when the container top portion may face away from ground and the drip stop valve assembly 110 may face towards the ground) and when the apparatus 100 may not be placed on any fluid vessel or vessel, as shown in FIG. 1A. In this arm position (i.e., the extended position), the fluid stored in the container interior portion may not flow out from the opening present in the container bottom portion, and hence fluid spillage from the apparatus 100 may be prevented. Further, in this arm position, a user may conveniently fill the container 108 with the fluid by using the fluid source 102, without risking fluid spillage. When the fluid may be filled in the container 108, the user may stop the fluid source 102 and may move the apparatus 100 (with the fluid filled-in) towards the fluid vessel 104. The user may then place the apparatus 100 on the vessel top end 106 such that the drip stop valve assembly 110 may be disposed towards the opening present at the vessel top end 106 (as shown in FIG. 1B), to make the fluid move from the container interior portion into the fluid vessel interior portion.

In some aspects, when the user places the apparatus 100 on the vessel top end 106, edges of the vessel top end 106 may push the arms 112 "upwards" towards the container interior portion (due to fluid weight associated with the fluid stored in the container 108 and an apparatus weight), thereby causing the arms 112 to move to the retracted position via the slits 114. Responsive to the arms 112 moving to the retracted position, the drip stop valve assembly 110 may enable fluid dispensation from the opening present in the container bottom portion to the fluid vessel interior portion. In this manner, the user may conveniently transfer the fluid from the apparatus 100 into the fluid vessel 104 by simply placing the apparatus 100 on the fluid vessel 104, without risking fluid spillage.

Although the description above describes an aspect where the arms 112 move to the retracted position when the apparatus 100 is placed on the vessel top end 106, however, the present disclosure is not limited to such an aspect. In other aspects, the user may manually push the drip stop valve assembly 110 or the arms 112 upwards towards the container interior portion to move the arms 112 to the retracted position, thereby enabling fluid dispensation from the opening present in the container bottom portion.

In further aspects, the apparatus 100 may include a filter (not shown in FIGS. 1A and 1B) that may be disposed in the container interior portion. The filter may be configured to remove impurities from the fluid when the fluid may be stored in the container interior portion and before the fluid may be dispensed from the opening present in the container bottom portion. Since the apparatus 100 includes the filter, the user may conveniently treat the fluid (e.g., water) that may be received from the fluid source 102 by storing the fluid in the container interior portion. Treated fluid, with minimal or no impurities, may then be transferred to the fluid vessel 104 by placing the apparatus 100 over the vessel top end 106, as described above.

In this manner, the apparatus 100 enables the user to conveniently fill the container interior portion by receiving the fluid from the fluid source 102 (thereby enabling removal of impurities from the fluid by the filter), move the apparatus 100 away from the fluid source 102 towards the fluid vessel 104 without risking fluid spillage (because the drip stop valve assembly 110 may disable fluid dispensation from the apparatus 100 when the apparatus 100 may not be placed over the vessel top end 106), and place the apparatus 100 on the vessel top end 106 to enable transfer of "treated" or "clean" fluid from the apparatus 100 to the fluid vessel interior portion. The apparatus 100 may be made of light weight material, and hence may be portable and convenient for the user to carry and move from one location to another.

Structural and functional apparatus details (e.g., details associated with the drip stop valve assembly 110, the container 108, the filter, etc.) are described below in conjunction with the subsequent figures.

Figure 2:
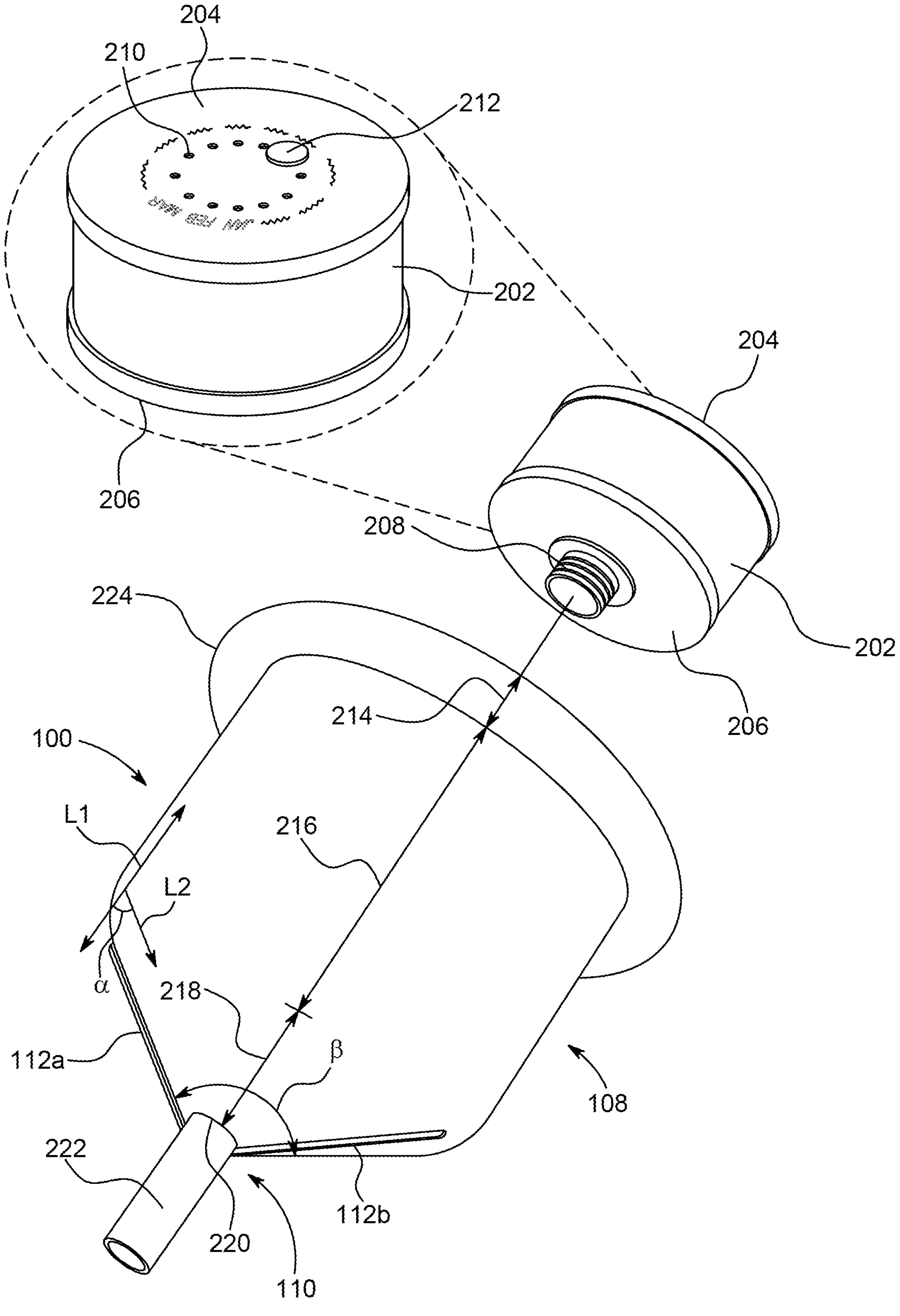
FIG. 2 depicts an example filtration apparatus including a filter in accordance with the present disclosure.

FIG. 2 depicts the apparatus 100 including a filter 202 in accordance with the present disclosure. As described above in conjunction with FIGS. 1A and 1B, in addition to the filter 202, the apparatus 100 may include the container 108 and the drip stop valve assembly 110 (or assembly 110). The filter 202 may be disposed in the container interior portion, and may be configured to remove impurities from the fluid before the fluid may be dispensed from the apparatus 100 (or from the opening present in the container bottom portion), as described above in conjunction with FIGS. 1A and 1B.

In some aspects, the filter 202 may be a carbon activated filter. In other aspects, the filter 202 may be any other type of filter including, but not limited to, a sediment filter, an ion exchange filter, an activated alumina filter, a ceramic filter, and/or the like. The filter 202 may include a filter top portion 204 and a filter bottom portion 206. The filter bottom portion 206 may include a male filter fastener 208 that may be, for example, a thumb screw, a nut and bolt fastener, a screw, a cylindrical protrusion with a threaded exterior surface (as shown in FIG. 2), and/or the like. In some aspects, the male filter fastener 208 may be cylindrical in shape and may have a hollow interior portion. Further, the male filter fastener 208 may have open top and bottom ends. The user may removably attach or dispose the filter 202 in the container interior portion by attaching the male filter fastener 208 with a female fastening member (not shown in FIG. 2) that may be present in the container interior portion.

In additional aspects, the filter top portion 204 may include a plurality of cavities 210 that may be formed on an external/exterior surface of the filter top portion 204. In an exemplary aspect, the filter top portion 204 may include 12 cavities that may correspond to different months of a year, and each cavity 210 may correspond to one month. For example, a first cavity may correspond to January, a second cavity may correspond to February, a third cavity may correspond to March, and so on. Further, a corresponding month name may be printed adjacent to each cavity 210, as shown in FIG. 2. In some aspects, the apparatus 100 and/or the filter 202 may be packaged with a marker or a pin 212 that may be inserted into one of the cavities 210 based on a month of filter purchase or installation in the apparatus 100. For example, if the user purchases and installs the filter 202 in the apparatus 100 in the month of January, the user may insert the pin 212 into the cavity 210 that corresponds to the month of January. In this manner, the user may mark the month of filter installation in the apparatus 100. If the filter 202 has an operating lifespan of 6 months or 12 months, the user may use the pin location to determine/recall the month of filter installation in the apparatus 100, and hence replace the filter 202 with a new filter at the end of 6 months or 12 months. In this manner, the pin 212 and the cavities 210 may enable the user to keep a track/record of filter installation time and facilitate in timely filter replacement.

A person ordinarily skilled in the art may appreciate that the pin 212 and the cavities 210 represent just one (and exemplary) system for tracking filter installation time. The apparatus 100 or the user may use any other tracking method/system to track filter installation time, without departing from the present disclosure scope.

Furthermore, although the filter 202 is depicted to be cylindrical in shape with circular filter top and bottom portions 204, 206 in FIG. 2, however, the present disclosure is not limited to such a filter shape. The filter 202 may have any other shape (e.g., having square, rectangular, pentagonal, hexagonal, etc. cross-section), without departing from the present disclosure scope.

In some aspects, as shown in FIG. 2, the container 108 may be shaped as a funnel. In other aspects, the container 108 may be U-shaped. The container 108 may be made of light material such as stainless steel, aluminum, plastic, and/or the like. In a preferred aspect, the container 108 is made of stainless steel. The container 108 may have a hollow container interior portion, and may include a container top portion 214, a container middle portion 216 and a container bottom portion 218. In some aspects, the container top portion 214 may be open and circular in shape with a diameter in a range of 4 to 8 inches. In other aspects, a container top portion may have any diameter, depending on container fluid storage capacity requirements. In an exemplary aspect, the container fluid storage capacity may be in a range of 0.5 to 2 liters. The container interior portion may receive the fluid from the fluid source 102 via the container top portion 214. As described above, the container interior portion may be hollow and may store the fluid received via the container top portion 214.

In some aspects, as shown in FIG. 2, the container middle portion 216 may be cylindrical in shape. A container middle portion diameter may be equivalent to the container top portion diameter or may be a portion (e.g., 75-85%) of the container top portion diameter. The container middle portion 216 may have any length, depending on the container fluid storage capacity requirements. In other aspects (not shown), the container middle portion 216 may have a tapered diameter that gradually decreases from the container top portion 214 to the container bottom portion 218.

The container bottom portion 218 may have a tapered diameter that gradually decreases from an intersection point of the container bottom portion 218 and the container middle portion 216 towards a container bottom end 220. In some aspects, a diameter of a top end of the container bottom portion 218 may be equivalent to the container middle portion diameter, and a container bottom end diameter may be 10-20% of the container middle portion diameter. A container middle portion longitudinal axis "L1" (which may be same as a container longitudinal axis) may be inclined at a predefined (non-zero) angle "$\alpha$" relative to a container bottom portion longitudinal axis "L2". The angle "$\alpha$" may be in a range of 30 to 60 degrees. Furthermore, the container bottom portion 218 may have any length, depending on the apparatus/container usage requirements. The angled bottom portion of the apparatus 100/container 108 is symmetrical in shape, and hence can "rest" on any fluid vessel (e.g., bottle, carafe, etc.) that the user may have at user's home for serving water. Further, the container 108 does not include any protruding handles, and hence the apparatus 100 can rest symmetrically on the fluid vessel 104 without tilting on any side. Specifically, the symmetrical funnel-shaped design of the apparatus 100/container 108, combined with the angled bottom portion, makes the apparatus 100 guide itself and "rest in position" on top of the rim of the fluid vessel 104 and stay upright (and not tilt) when the apparatus 100 may be placed on top of the fluid vessel 104.

As described above in conjunction with FIGS. 1A and 1B, the container wall associated with the container bottom portion 218 may include one or more elongated slits or through-holes. For example, a first elongated slit 114*a* and a second elongated slit 114*b* (not shown in FIG. 2, shown in FIG. 1B) may be located on the container wall at the container bottom portion 218. As described above, the arms 112*a*, 112*b* (that may be part of the assembly 110) may move between the extended position and the retracted position by moving up and down through the slits 114.

In some aspects, the first elongated slit 114*a* may be disposed opposite to the second elongated slit 114*b* on the container wall at the container bottom portion 218. Stated another way, an angular displacement "β" (shown in FIG. 2) between the first elongated slit 114*a* and the second elongated slit 114*b* on the container wall at the container bottom portion 218 may be 180 degrees.

A first elongated slit length may be equivalent to a second elongated slit length. Further, the first elongated slit length and the second elongated slit length may in a range of 50 to 100% of a container bottom portion length. In some aspects, the first elongated slit 114*a* and the second elongated slit 114*b* may be disposed along the container bottom portion length such that distal ends of the first and second elongated slits 114*a*, 114*b* may be disposed at the container bottom end 220 and proximal ends of the first and second elongated slits 114*a*, 114*b* may be disposed anywhere between the container bottom end 220 and the intersection point of the container bottom portion 218 and the container middle portion 216. Further, the first and second elongated slits 114*a*, 114*b* may be linear or straight slits, and longitudinal axis associated with the first and second elongated slits 114*a*, 114*b* may be parallel to the container bottom portion longitudinal axis "L2". Furthermore, in some aspects, a first elongated slit width may be equivalent to a second elongated slit width, which in turn may be equivalent to or greater than thicknesses of the arms 112*a*, 112*b*.

Although the description above describes an aspect where the container 108 includes two elongated slits 114, the present disclosure is not limited to such an aspect. The container 108 may include more or less than two elongated slits, without departing from the present disclosure scope. In this case, the assembly 110 may also include more or less than two arms 112.

Figure 4:
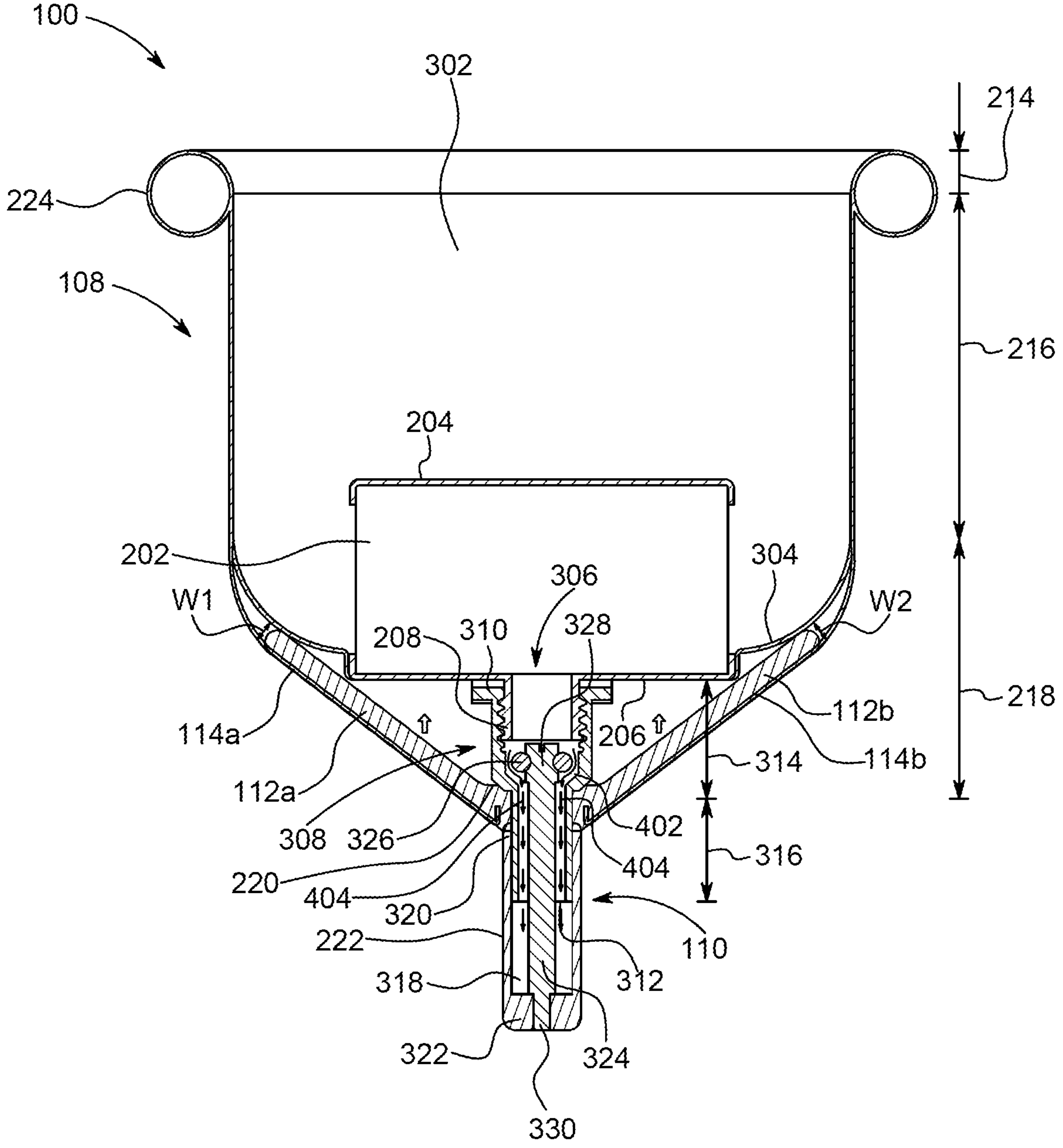
FIG. 4 depicts a second cross-sectional view of an example filtration apparatus in accordance with the present disclosure.
Figure 5:
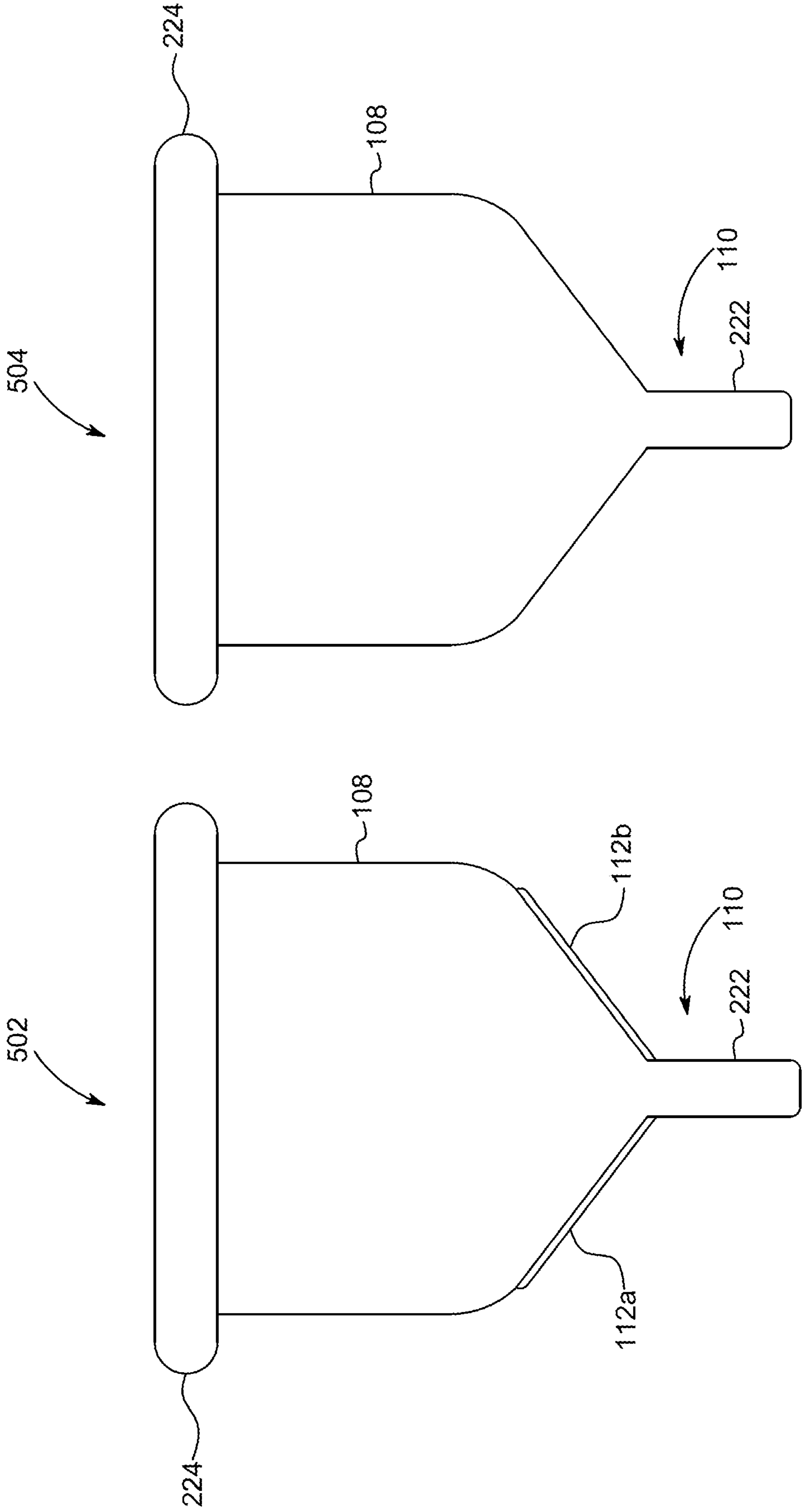
FIG. 5 depicts views of an example filtration apparatus with drip stop valve arms in extended and retracted positions in accordance with the present disclosure.

In some aspects, an arm length may be equivalent to or less than the first and second elongated slit lengths. The assembly 110 may further include an elongated valve member 222 that may be attached to arm distal ends. The elongated valve member 222 may be shaped as a hollow cylinder and may have open top and bottom ends. The user may move the arms 112 to the retracted position (and into the container interior portion via the slits 114) by pushing the elongated valve member 222 upwards along the container longitudinal axis ("L1") towards the container top portion 214/container middle portion 216. Since the elongated valve member 222 is attached to the arm distal ends, upward elongated valve member push results in an upward arm movement into the container interior portion via the slits 114, thus enabling the arms to move to the retracted position. As described above in conjunction with FIGS. 1A and 1B, the assembly 110 may enable fluid dispensation from the container interior portion/apparatus 100 to outside when the arms 112 may be moved to the retracted position. Functional details associated with the assembly 110 may be understood in conjunction with the description of FIGS. 3-5, provided later below.

In some aspects, the container 108 may further include a grip 224 (or a grip portion) that may be disposed along a container top portion circumference. Specifically, the container wall at the container top portion 214 may be curved outwards towards a container exterior portion to form the grip 224. The grip 224 may enable the user to conveniently hold the apparatus 100/container 108, when the user may be filling the container 108 with the fluid or when the user may be moving the apparatus 100 (with or without the fluid in the container 108) from one location to another.

Figure 3:
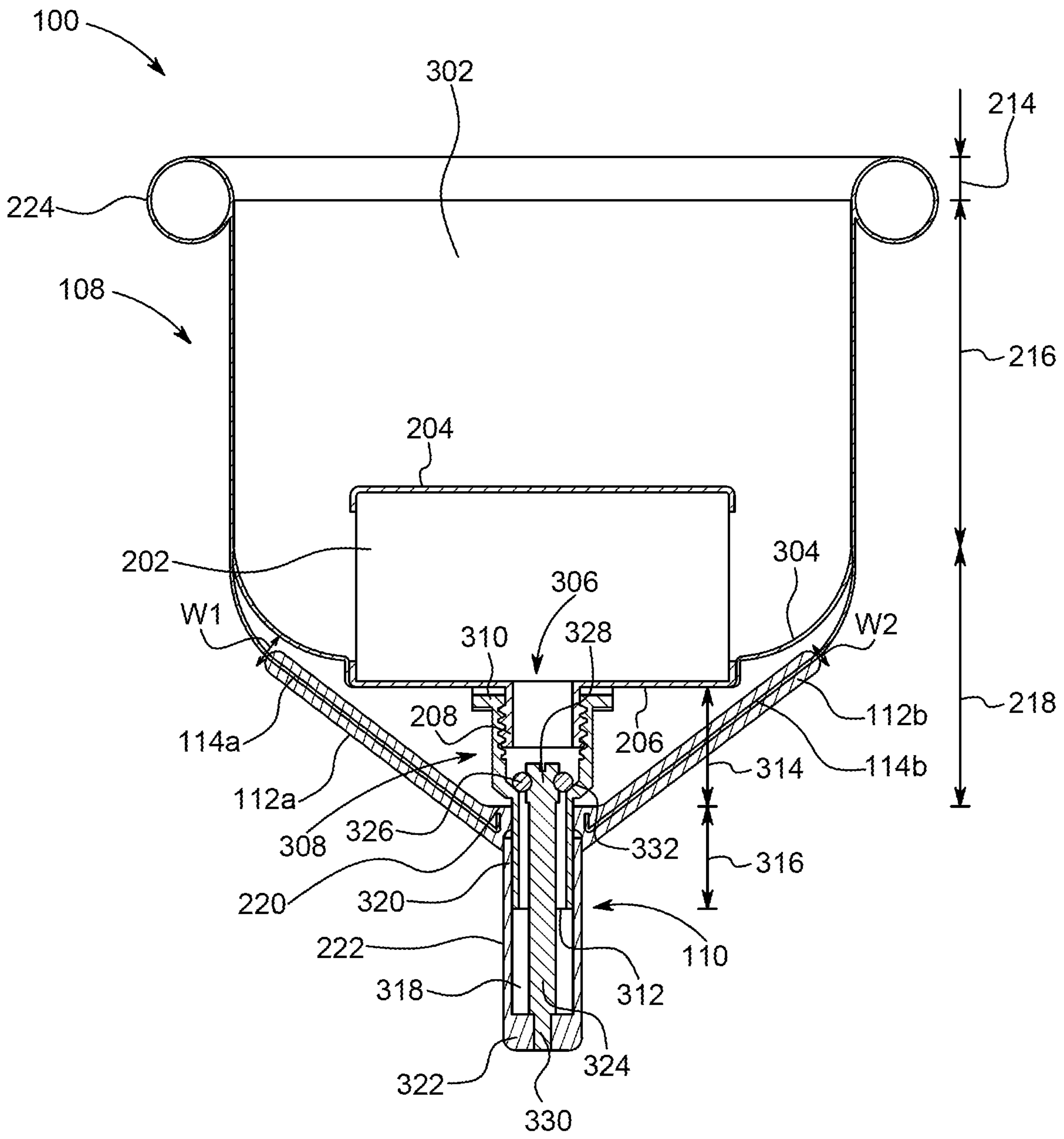
FIG. 3 depicts a first cross-sectional view of an example filtration apparatus in accordance with the present disclosure.

FIG. 3 depicts a first cross-sectional view of the apparatus 100 in accordance with the present disclosure. Specifically, FIG. 3 depicts an apparatus cross-sectional view (A-A sectional view) when the arms 112 may be in the extended position. While describing FIG. 3, references will be made to FIGS. 4 and 5. FIG. 4 depicts a second cross-sectional view (A-A sectional view) of the apparatus 100, when the arms 112 may be in the retracted position. FIG. 5 depicts external apparatus views 502, 504. The view 502 depicts an apparatus external view when the arms 112 may be in the extended position, and the view 504 depicts the apparatus external view when the arms 112 may be in the retracted position.

As described above in conjunction with FIGS. 1A, 1B and 2, the apparatus 100 may include the container 108, the filter 202 and the assembly 110. As shown in FIGS. 3 and 4, the filter 202 may be disposed in proximity to the container bottom portion 218. Specifically, a container interior portion 302 may include a fluid holding layer or base 304 on which the filter 202 may rest when the filter 202 may be inserted and attached to the apparatus 100. The base 304 may be made of same material as the container 108, and may be disposed in the container bottom portion 218, as shown in FIGS. 3 and 4. The base 304 may be made of thin, lightweight and robust material that may not allow/enable the fluid to leak/spill when the fluid may be filled in the container 108. Specifically, when the user fills the container 108 with fluid, the fluid may get stored on the base 304, and the user may fill the fluid till a maximum level of up to the container top portion 214.

The base 304 (and hence the container bottom portion 218) may include an opening 306 through which the fluid stored in the container 108 may be dispensed to outside the apparatus 100 (e.g., when the assembly 110 enables fluid dispensation from the apparatus 100).

As described above, the assembly 110 may be disposed at the container bottom portion 218 (as shown in FIGS. 3 and 4) and may include the first arm 112*a*, the second arm 112*b* and the elongated valve member 222. The first arm 112*a* may be disposed in proximity to the first elongated slit 114*a*, and a first arm longitudinal axis may be aligned or parallel to a first elongated slit longitudinal axis. The first arm 112*a* may be configured to move between the retracted position and the extended position via the first elongated slit 114*a*. Specifically, the first arm 112*a* may be in the retracted position when the first arm 112*a* may be inserted into container interior portion 302 laterally or along a first arm width "W1" via the first elongated slit 114*a*, as shown in FIG. 4. The apparatus external view with the first arm 112*a* in the retracted position is shown in the view 504 of FIG. 5. In some aspects, the first arm 112*a* may be in the retracted position when the first arm width "W1" may be completely (or substantially) inserted into the container interior portion 302, as shown in FIG. 4. As described above, the first arm 112*a* may move to the retracted position when the apparatus 100 may be placed on the vessel top end 106 or when the user manually pushes the assembly 110 upwards towards the container top portion 214. Further, as described above, the assembly 110 may enable fluid dispensation from the opening 306 when the first arm 112*a* may be in the retracted position. The process of enablement or disablement of fluid dispensation from the opening 306 by the assembly 110 is described later in the description below.

The first arm 112*a* may be in the extended position when the first arm 112*a* or the first arm width "W1" protrudes out towards a container exterior portion and away from the container interior portion 302 via the first elongated slit 114*a*, as shown in FIG. 3. The apparatus external view with the first arm 112*a* in the extended position is shown in the view 502 of FIG. 5. In some aspects, the first arm 112*a* may be in the extended position when at least 50% of the first arm width "W1" may be outside of the container interior portion 302. As described above, the first arm 112*a* may move to the extended position due to assembly or apparatus weight when the user holds the apparatus 100 in a manner such that the assembly 110 may face towards the ground and the container top portion 214 may face away from the ground (and when the apparatus 100 may not be placed on the vessel top end 106). Further, as described above, the assembly 110 may disable fluid dispensation from the opening 306 when the first arm 112*a* may be in the extended position.

Similar to the first arm 112*a*, the second arm 112*b* may be disposed in proximity to the second elongated slit 114*b*, and a second arm longitudinal axis may be aligned or parallel to a second elongated slit longitudinal axis. The second arm 112*b* may be configured to move between the retracted position and the extended position via the second elongated slit 114*b*. Specifically, the second arm 112*b* may be in the retracted position when the second arm 112*b* may be inserted into the container interior portion 302 laterally or along a second arm width "W2" via the second elongated slit 114*b*, as shown in FIG. 4. In some aspects, the first arm width "W1" may be equivalent to the second arm width "W2". Similar to the first arm 112*a*, the second arm 112*b* may be in the retracted position when the second arm width "W2" may be completely (or substantially) inserted into the container interior portion 302. The second arm 112*b* may move to the retracted position in the same manner as the first arm 112*a*, and the assembly 110 may enable fluid dispensation from the opening 306 when both the first and second arms 112*a*, 112*b* may be in the retracted positions.

The second arm 112*b* may be in the extended position when the second arm 112*b* or the second arm width "W2" protrudes out towards the container exterior portion and away from the container interior portion 302 via the via the second elongated slit 114*b*, as shown in FIG. 3. In some aspects, the second arm 112*b* may be in the extended position when at least 50% of the second arm width "W2" may be outside of the container interior portion 302. The second arm 112*a* may move to the extended position in the same manner as the first arm 112*a* moves to the extended position. Further, the assembly 110 may disable fluid dispensation from the opening 306 when both the first and second arms 112*a*, 112*b* may be in the extended positions.

In some aspects, the apparatus 100 may further include an opening connection member 308 that may be disposed at or in proximity to the opening 306, as shown in FIGS. 3 and 4. The opening connection member 308 may be made of plastic, stainless steel, aluminum, and/or the like, and may be shaped as a cylinder. The opening connection member 308 may have a hollow interior portion, an open member top end 310 and an open member bottom end 312. The member top end 310 may be configured to receive "treated" or "clean" fluid from the filter 202, and the member bottom end 312 may be configured to dispense or output the fluid from the opening connection member 308. The member top end 310 may be disposed in proximity to the filter bottom portion 206 (as shown in FIGS. 3 and 4) and configured to receive the fluid from the filter 202.

The opening connection member 308 may include a top connection member portion 314 and a bottom connection member portion 316. In some aspects, a top connection member portion diameter may be greater than a bottom connection member portion diameter, as shown in FIGS. 3 and 4. In an exemplary aspect, the bottom connection member portion diameter may be 40-70% of the top connection member portion diameter. The top connection member portion 314 may be disposed in the container bottom portion 218 and the bottom connection member portion 316 may be disposed inside the elongated valve member 222, as shown in FIGS. 3 and 4. The filter 202 may be removably attached to the top connection member portion 314. Specifically, an interior surface of the top connection member portion 314 may have a threaded portion, and the external surface of the male filter fastener 208 (that may have threads) may engage with the threaded portion associated with the interior surface of the top connection member portion 314 to attach the filter 202 with the top connection member portion 314 (and hence to the opening connection member 308), as shown in FIGS. 3 and 4. In some aspects, the male filter fastener 208 may have a hollow interior portion and open top and bottom ends. The fluid may flow from the container interior portion 302, via the filter 202, towards the open top end associated with the male filter fastener 208, which in turn may transfer the fluid to the top connection member portion 314. In this manner, the fluid "treated" by the filter 202 may flow from the container interior portion 302 towards the top connection member portion 314.

In some aspects, the male filter fastener 208 may be shaped as a cylinder and a male filter fastener diameter may be equivalent to an interior surface diameter associated with the top connection member portion 314, which enables secure attachment between the male filter fastener 208 and the top connection member portion 314.

In some aspects, an elongated valve member longitudinal axis may be parallel to the container longitudinal axis, and the elongated valve member 222 may be shaped as a cylinder having a hollow interior valve portion 318. As described above, the bottom connection member portion 316 may be disposed inside the elongated valve member 222. Specifically, an interior surface of the elongated valve member 222 may be disposed in proximity to or may touch an exterior surface of the bottom connection member portion 316. In some aspects, an interior surface diameter associated with the elongated valve member 222 may be equivalent to an exterior surface diameter associated with the bottom connection member portion 316. A bottom connection member portion length may be a portion (e.g., in a range of 40-70%) of an elongated valve member length.

The elongated valve member 222 may further include a valve proximal end 320 and a valve distal end 322 (which may be open ends that enable flow of fluid into and out from the elongated valve member 222). Distal ends of the arms 112 may be attached to an external surface of the valve proximal end 320, as shown in FIGS. 3 and 4. In some aspects, the arm distal ends may be attached to the external surface of the valve proximal end 320 such that an arm longitudinal axis may be inclined at the angle "α" (shown in FIG. 2) relative to the elongated valve member longitudinal axis.

In some aspects, the assembly 110 may further include an elongated rigid fastener 324 and an O-ring 326. The elongated rigid fastener 324 may be made of metal or plastic, and may be shaped as a cylindrical (or of any other shape) rod or shaft. The elongated rigid fastener 324 may have a fastener proximal end 328 and a fastener distal end 330. In some aspects, a fastener proximal end diameter may be greater than a fastener distal end diameter. In other aspects, the fastener proximal end diameter may be equivalent to the fastener distal end diameter.

The elongated rigid fastener 324 may be enclosed in or between the hollow interior valve portion 318 and hollow interior portions of the top connection member portion 314 and the bottom connection member portion 316, as shown in FIGS. 3 and 4. Further, an elongated rigid fastener longitudinal axis may be parallel to the elongated valve member longitudinal axis (and hence the container longitudinal axis). In some aspects, an elongated rigid fastener length may be greater than an elongated valve member length, and the fastener distal end 330 may be attached (via adhesive, screw, threaded surfaces, and/or the like) to the valve distal end 322. Further, the fastener proximal end 328 may be disposed in the hollow interior portion of the top connection member portion 314, as shown in FIGS. 3 and 4. The fastener proximal end 328 may be disposed in the top connection member portion 314 such that an elongated rigid fastener top end may be disposed a predefined distance away from the opening 306 and may not be in proximity to the opening 306 (or may not touch the opening 306), as shown in FIGS. 3 and 4.

Furthermore, the O-ring 326 may be circumferentially attached to (i.e., attached along a periphery of) the fastener proximal end 328. The O-ring 326 may be attached to the fastener proximal end 328 and may have dimensions such that the O-ring 326 may "rest" on an intersection point 332 of the top connection member portion 314 and the bottom connection member portion 316 when the arms 112 may be in the extended positions, as shown in FIG. 3. In some aspects, when the O-ring 326 may be resting on the intersection point 332, a flow opening 402 (shown in FIG. 4) associated with the intersection point 332 may be blocked by the O-ring 326, which may prevent fluid dispensation (or fluid flow) from the top connection member portion 314 towards the bottom connection member portion 316 (and hence prevent fluid dispensation to the hollow interior valve portion 318 and eventually out from the open valve distal end 322).

During operation, when the user holds the apparatus 100 vertically and/or fills the fluid in the container interior portion 302 (e.g., by using the fluid source 102), the arms 112 may move to the extended position (as shown in FIG. 3) due to the assembly weight, as described above. When the arms 112 move to the extended position (i.e., "downwards", away from the container top portion 214), the elongated valve member 222 also moves downwards since the arm distal ends are connected to the elongated valve member 222. Downward elongated valve member movement causes the elongated rigid fastener 324 to also move down, which in turn results in the O-ring 326 moving down and blocking the flow opening 402, as shown in FIG. 3. When the flow opening 402 may be blocked, the fluid may not be able to flow from the container interior portion 302 towards the hollow interior portion/part of the bottom connection member portion 316 (via the opening 306 and the top connection member portion 314), thereby preventing fluid dispensation from the apparatus 100.

When the user places the apparatus 100 on the vessel top end 106 or manually pushes the assembly 110 or the arms 112 "upwards" towards the container top portion 214, the arms 112 may move to the retracted position. Upward arm movement may cause the elongated valve member 222 to also move upwards along the container longitudinal axis, which in turn results in an upward elongated rigid fastener movement. When the elongated rigid fastener 324 moves upwards, the O-ring 326 also moves upwards, thereby unblocking the flow opening 402, as shown in FIG. 4.

When the flow opening 402 may be unblocked, the fluid may flow from the container interior portion 302 to the opening 306 (via the filter 202), and then towards the hollow interior portion/part of the top connection member portion 314. The fluid may further flow from the hollow interior portion/part of the top connection member portion 314 towards the hollow interior portion/part of the bottom connection member portion 316, via the unblocked or "open" flow opening 402, as shown by arrows 404 in FIG. 4. The fluid may then flow from the hollow interior portion/part of the bottom connection member portion 316 to the hollow interior valve portion 318, and then eventually out from the apparatus 100 via the open valve distal end 322 (and into the fluid vessel 104). In this manner, the fluid may flow from the container interior portion 302 to outside from the apparatus 100 when the flow opening 402 may be unblocked by the upward arm movement.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A filtration apparatus comprising:

a container comprising a container top portion, a container bottom portion and a container interior portion, wherein:

the container interior portion is configured to receive a fluid, and the container bottom portion comprises an opening to dispense the fluid;

a filter disposed in the container interior portion, wherein the filter is configured to remove impurities from the fluid before the fluid is dispensed from the opening;

a first elongated slit located on a container wall at the container bottom portion; and a drip valve assembly disposed at the container bottom portion, wherein:

the drip valve assembly comprises a first arm disposed in proximity to the first elongated slit, the first arm is configured to move between a first extended position and a first retracted position, the first arm is in the first retracted position when the first arm is inserted into the container interior portion via the first elongated slit, the first arm is in the first extended position when the first arm protrudes out towards a container exterior portion and away from the container interior portion via the first elongated slit, and the drip valve assembly enables fluid dispensation from the opening when the first arm is in the first retracted position, and disables fluid dispensation from the opening when the first arm is in the first extended position.

2. The filtration apparatus of claim 1 further comprising a second elongated slit disposed on the container wall at the container bottom portion and opposite to the first elongated slit.

3. The filtration apparatus of claim 2, wherein the drip valve assembly further comprises a second arm disposed in proximity to the second elongated slit, and wherein:

the second arm is configured to move between a second extended position and a second retracted position, the second arm is in the second retracted position when the second arm is inserted into the container interior portion via the second elongated slit, the second arm is in the second extended position when the second arm protrudes out towards the container exterior portion and away from the container interior portion via the second elongated slit, the drip valve assembly enables fluid dispensation from the opening when the second arm is in the second retracted position, and the drip valve assembly disables fluid dispensation from the opening when the second arm is in the second extended position.

4. The filtration apparatus of claim 3, wherein a first arm longitudinal axis is aligned with a first elongated slit longitudinal axis and a second arm longitudinal axis is aligned with a second elongated slit longitudinal axis.

5. The filtration apparatus of claim 1 further comprising an opening connection member disposed at the opening, wherein the opening connection member comprises a top connection member portion and a bottom connection member portion, and wherein the opening connection member comprises a hollow interior portion, an open top end and an open bottom end.

6. The filtration apparatus of claim 5, wherein the filter is removably attached to the top connection member portion.

7. The filtration apparatus of claim 5, wherein the drip valve assembly further comprises:

an elongated valve member having a hollow interior valve portion, a valve proximal end and a valve distal end, wherein an interior surface of the elongated valve member is disposed in proximity to an exterior surface of the bottom connection member portion;

an elongated rigid fastener having a fastener proximal end and a fastener distal end, wherein the elongated rigid fastener is enclosed between the hollow interior portion of the opening connection member and the hollow interior valve portion, and wherein the fastener distal end is connected with the valve distal end and the fastener proximal end is disposed in the hollow interior portion of the top connection member portion; and an O-ring circumferentially attached to the fastener proximal end, wherein:

a distal end of the first arm is attached to an exterior surface of the elongated valve member, the elongated valve member, the elongated rigid fastener and the O-ring move upwards along a container longitudinal axis when the first arm moves to the first retracted position, and the fluid is dispensed from the opening when the O-ring moves upwards.

8. The filtration apparatus of claim 1, wherein the filtration apparatus is a gravity-based water filtration apparatus.

9. The filtration apparatus of claim 1, wherein the fluid is water.

10. The filtration apparatus of claim 1, wherein the container is shaped as a funnel.

11. The filtration apparatus of claim 1, wherein the container is U-shaped.

12. The filtration apparatus of claim 1, wherein the container further comprises a grip portion disposed along a container top portion circumference.

13. The filtration apparatus of claim 12, wherein the container further comprises the container exterior portion, and wherein the container top portion is curved outwards towards the container exterior portion to form the grip portion.

14. The filtration apparatus of claim 1, wherein the filter is disposed in proximity to the container bottom portion.

15. The filtration apparatus of claim 1, wherein the container interior portion is hollow and configured to receive the fluid via the container top portion, and wherein the container interior portion is configured to store the fluid received via the container top portion.

16. The filtration apparatus of claim 1, wherein the filter is carbon activated filter.

17. A filtration apparatus comprising:

a container comprising a container top portion, a container bottom portion and a container interior portion, wherein:

the container interior portion is configured to receive a fluid, and the container bottom portion comprises an opening to dispense the fluid;

a filter disposed in the container interior portion, wherein the filter is configured to remove impurities from the fluid before the fluid is dispensed from the opening;

an elongated slit located on a container wall at the container bottom portion;

a drip valve assembly disposed at the container bottom portion, wherein:

the drip valve assembly comprises an arm disposed in proximity to the elongated slit, the arm is configured to move between an extended position and a retracted position, the arm is in the retracted position when the arm is inserted into the container interior portion via the elongated slit, the arm is in the extended position when the arm protrudes out towards a container exterior portion and away from the container interior portion via the elongated slit, and the drip valve assembly enables fluid dispensation from the opening when the arm is in the retracted position, and disables fluid dispensation from the opening when the arm is in the first extended position; and an opening connection member disposed at the opening, wherein:

the opening connection member comprises a top connection member portion and a bottom connection member portion, and the filter is removably attached to the top connection member portion.

18. The filtration apparatus of claim 17, wherein the opening connection member comprises a hollow interior portion, an open top end and an open bottom end, and wherein the drip valve assembly further comprises:

an elongated valve member having a hollow interior valve portion, a valve proximal end and a valve distal end, wherein an interior surface of the elongated valve member is disposed in proximity to an exterior surface of the bottom connection member portion;

an elongated rigid fastener having a fastener proximal end and a fastener distal end, wherein the elongated rigid fastener is enclosed between the hollow interior portion of the opening connection member and the hollow interior valve portion, and wherein the fastener distal end is connected with the valve distal end and the fastener proximal end is disposed in the hollow interior portion of the top connection member portion; and an O-ring circumferentially attached to the fastener proximal end, wherein:

a distal end of the arm is attached to an exterior surface of the elongated valve member, the elongated valve member, the elongated rigid fastener and the O-ring move upwards along a container longitudinal axis when the arm moves to the retracted position, and the fluid is dispensed from the opening when the O-ring moves upwards.

19. A filtration apparatus comprising:

a container comprising a container top portion, a container bottom portion and a container interior portion, wherein:

the container interior portion is configured to receive a fluid, and the container bottom portion comprises an opening to dispense the fluid;

a filter disposed in the container interior portion, wherein the filter is configured to remove impurities from the fluid before the fluid is dispensed from the opening;

a first elongated slit and a second elongated slit located on a container wall at the container bottom portion; and a drip valve assembly disposed at the container bottom portion, wherein:

the drip valve assembly comprises a first arm disposed in proximity to the first elongated slit and a second arm disposed in proximity to the second elongated slit, the first arm is configured to move between a first extended position and a first retracted position and the second arm is configured to move between a second extended position and a second retracted position, the first arm and the second arm are in the first retracted position and the second retracted position respectively when the first arm and the second arm are inserted into the container interior portion via the first elongated slit and the second elongated slit, the first arm and the second arm are in the first extended position and the second extended position respectively when the first arm and the second arm protrude out towards a container exterior portion and away from the container interior portion via the first elongated slit and the second elongated slit, and the drip valve assembly enables fluid dispensation from the opening when the first arm is in the first retracted position and the second arm is in the second retracted position, and disables fluid dispensation from the opening when the first arm and the second arm are in the first extended position and the second extended position.

* * * * *